Angelo J. Campanella
INVENTOR.

BY William T. Fryer III

ATTORNEY

United States Patent Office 3,403,255
Patented Sept. 24, 1968

3,403,255
NAVIGATIONAL SYSTEM EMPLOYING NUCLEAR RADIATION GLIDE PATHS
Angelo J. Campanella, Columbus, Ohio, assignor to Industrial Nucleonics Corporation, a corporation of Ohio
Filed June 9, 1964, Ser. No. 373,735
19 Claims. (Cl. 250—83.3)

The present invention relates to the navigation of a craft, and more particularly, to a navigation system capable of operating in all types of weather.

It has become increasingly important to ensure that a craft, such as an airplane, have equipment for determining its location with respect to a designated area. For example, it is a common problem not to be able to see the landing area and have to utilize some navigational system to determine the proper direction and other guidance information for a safe landing. It is preferred that the craft have means for first acquiring the general direction of the designated area, and then to follow a predetermined path.

The problem stated above is not new, and several systems have been utilized that offer some solution. For example, most airports are provided with ground control approach systems (GCA) wherein the control tower operator observes a radar screen and talks the pilot to a landing. This system suffers from the disadvantage of unreliable information at low altitudes, such as below 100 feet, and the presence of some visibility must be counted on. Another example is the ILS, known by its more complete description as Instrument Landing System. This system is capable of guiding an aircraft by radio signals to an altitude approximately 300 or 400 feet from the runway. Again, the system depends on at least some visibility, because the radio signals do not give sufficient information at low altitudes.

The GCA and ILS systems are also relatively expensive, and are not suitable for very small airports or for use at temporary runways or landing areas such as are encountered in military situations. These systems are also highly complex and employ a large amount of equipment on the ground and in the aircraft.

It is the object of the present invention to provide a system for navigating a craft in all types of weather to a designated area.

It is a further object of the present invention to provide a system for navigating an aircraft along a predetermined path to a designated landing area.

It is a still further object of the present invention to provide a navigation system that requires a minimum of equipment installed on the ground or on the aircraft and is relatively simple in operation and of rugged construction.

It is another object of my invention to provide a navigation system suitable for use with all types of landing areas, such as in remote regions where only a small clear area for landing is available, or on landing platforms, on the tops of tall buildings, or at sea on platforms disposed on ships or supported from the ocean bottom on raised stilts.

It is a further object of the present invention to provide a navigation system that increases its accuracy as the range to the landing area decreases, permitting accurate control along a predetermined path for landing the aircraft.

It is a still further object of the present invention to provide a navigation system having apparatus that can be quickly rearranged at a new landing area or on another aircraft.

The present invention can be briefly described by reference to a preferred embodiment wherein the navigational system for a craft comprises a beacon to be positioned adjacent a designated area for projecting two beams of radiation spaced apart. These beams define a common region of fringe radiation. The craft is equipped with means for detecting the radiation to indicate the position of the craft relative to the beams. More specifically, the present invention can be further described in its application as a navigational system for an aircraft, wherein a beacon is positioned adjacent a landing area to radiate beams of nuclear radiation upward in the direction of a glide path to the landing area. One of the beams has a predominant radiation energy range and the other beam has another predominant radiation energy range. The beams are spaced along the glide path to form a region of commingled radiation energies with a region to one side having only one of the predominant radiation energy ranges and a region to the other side having only the other predominant radiation energy range. The aircraft is equipped with means for detecting the nuclear radiation to indicate the position of the aircraft between the means. The navigational system may also include a marker beacon positioned near the landing area to indicate the proper position for flare-out and the detection means can be arranged to provide an appropriate indication of the presence of the beam from the marker beacon.

These and other objects of the present invention are illustrated by the disclosed preferred embodiment, reference being to the attached figures wherein.

The detailed description of the present invention should be prefaced with a restatement of the problem that must be solved in guiding a craft to a designated area. First, there must be acquisition of the general location of the designated area. Second, there must be a predetermined path which the craft can follow. The present invention provides the navigational information for the craft from two or more beams of radiation. The craft is equipped with means for distinguishing between these two beams of radiation and for maintaining a predetermined relationship between these beams to reach the designated area. The beams are produced by a beacon adjacent the designated area. In one form the beams are of nuclear irradiation, each beam having a different predominant energy range to permit the separate identification of the beams. The relative intensities received by the craft from the two beams allow the craft to follow a predetermined path between the beams where the radiation intensities from the two beams are maintained substantially at a predetermined relationship.

The disclosed embodiment illustrates the use of the present invention in navigating an aircraft. However, the present invention may be employed equally as well with other types of crafts, such as ships, helicopters, blimps, for example. In a similar respect, the designated area to which the craft is to be guided may be a runway or any other location where the craft should reach along a predetermined path.

The overall arrangement of the disclosed navigating system 1 (FIG. 1) includes a landing beacon 2 disposed on ground 152 just adjacent to runway 3 at which aircraft 4 should land. Landing beacon 2 projects beams 5 and 6 upward in the same general direction. Beams 5 and 6 extend a considerable distance and are spaced on opposite sides, above and below, the glide path 7 which aircraft 4 should follow for its landing approach. Each of beams 5 and 6 has an identifying characteristic permitting aircraft 4 to maintain a predetermined relationship with respect to the beams, and to maintain this relationship to stay on glide path 4 until reaching runway 3.

Figures 1, 2, 3:
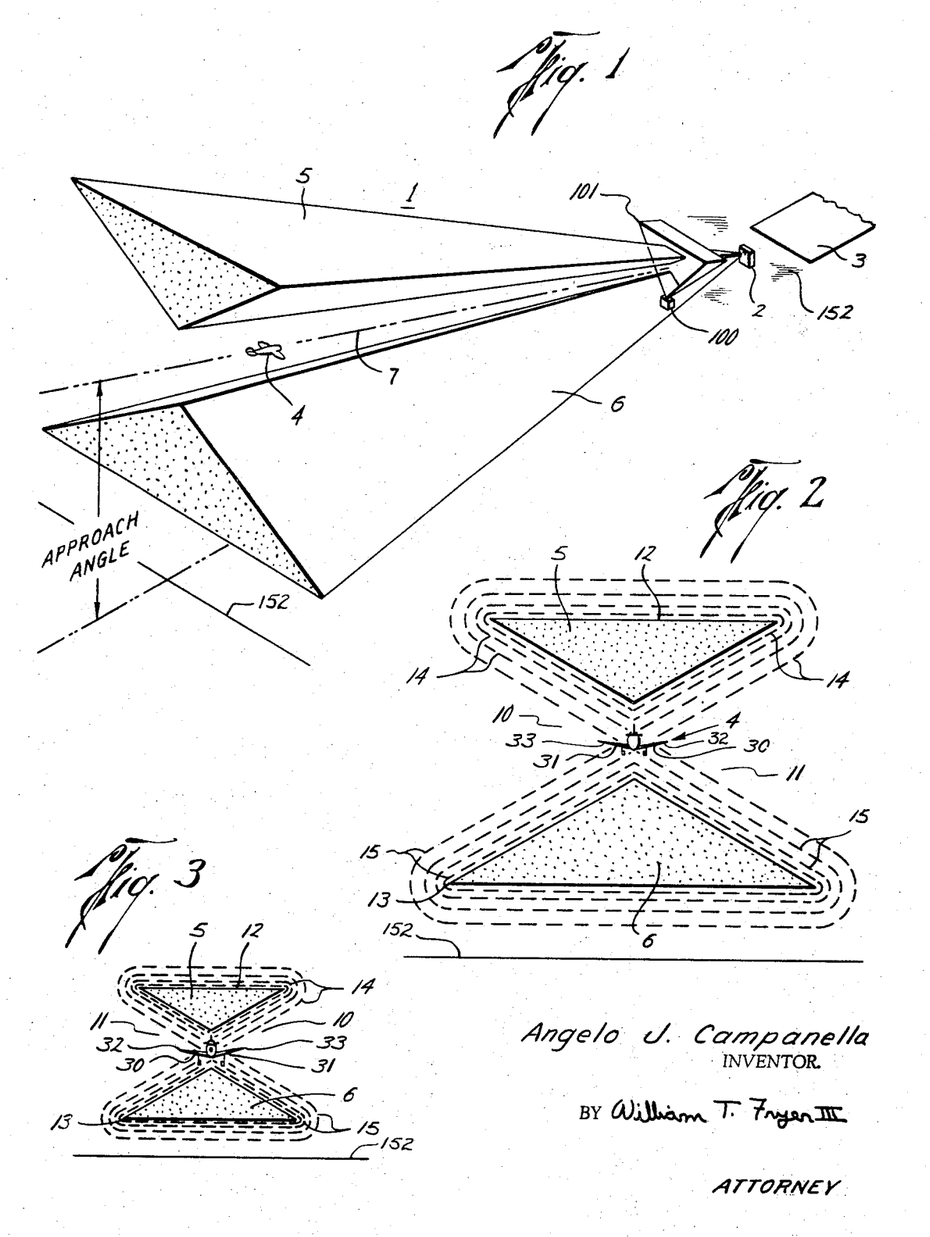
FIG. 1 is a perspective view of one embodiment of a navigational system in accordance with the present invention.
FIG. 2 is an elevation view in cross section through the landing beams, looking towards the rear of the aircraft, of the navigation system illustrated in FIG. 1.
FIG. 3 is an elevation view in cross section through the landing beams, looking at the front of the aircraft following the beams of the navigational system as shown in FIG. 1.

The identifying characteristic for each of the beams may be provided by using nuclear radiation, such as X-rays, bremsstrahlung, or gamma rays. In this embodiment landing beacon 2 is arranged such that beam 6 is formed of gamma radiation having a predominant radiation energy range and beam 5 is formed of gamma radiation having a different predominant radiation energy range. In this manner beams 5 and 6 can be distinguished by their predominant energy ranges. For example, beam 6 can have a higher predominant energy range than beam 5.

In addition to the distinguishing characteristics of beams 5 and 6, there is a unique beam configuration enabling a more precise determination of the position of aircraft 4. The intensity of beams 5 and 6 are tapered toward each others position, as best shown in FIGS. 2 and 3. FIG. 2 is a cross section through the beam at a higher elevation and at a greater distance than the view in FIG. 3. The taper effect produces regions of fringe radiation on the lateral sides 10 and 11 between beams 5 and 6. The direct uniform intensity radiation, i.e., straight line from the landing beacon 2, of beams 5 and 6 is substantially confined to triangular-shaped regions, as represented by the dotted lines enclosed within the triangles 12 and 13 (FIGS. 2 and 3). The radiation in each beam outside the triangular regions 12 and 13, has an intensity which decreases progressively with lateral distance from beams 5 and 6, as represented by the dash lines 14 for beam 5 and 15 for beam 6. Beam 6 extends further laterally than beam 5 to facilitate acquisition of the radiation from landing beacon 2. The cross-sectional area of beams 5 and 6 as shown in FIG. 3 is less than as shown in FIG. 2, because the view is taken closer to landing beacon 2 where the beams are proportionately smaller in size.

Figures 6, 7:
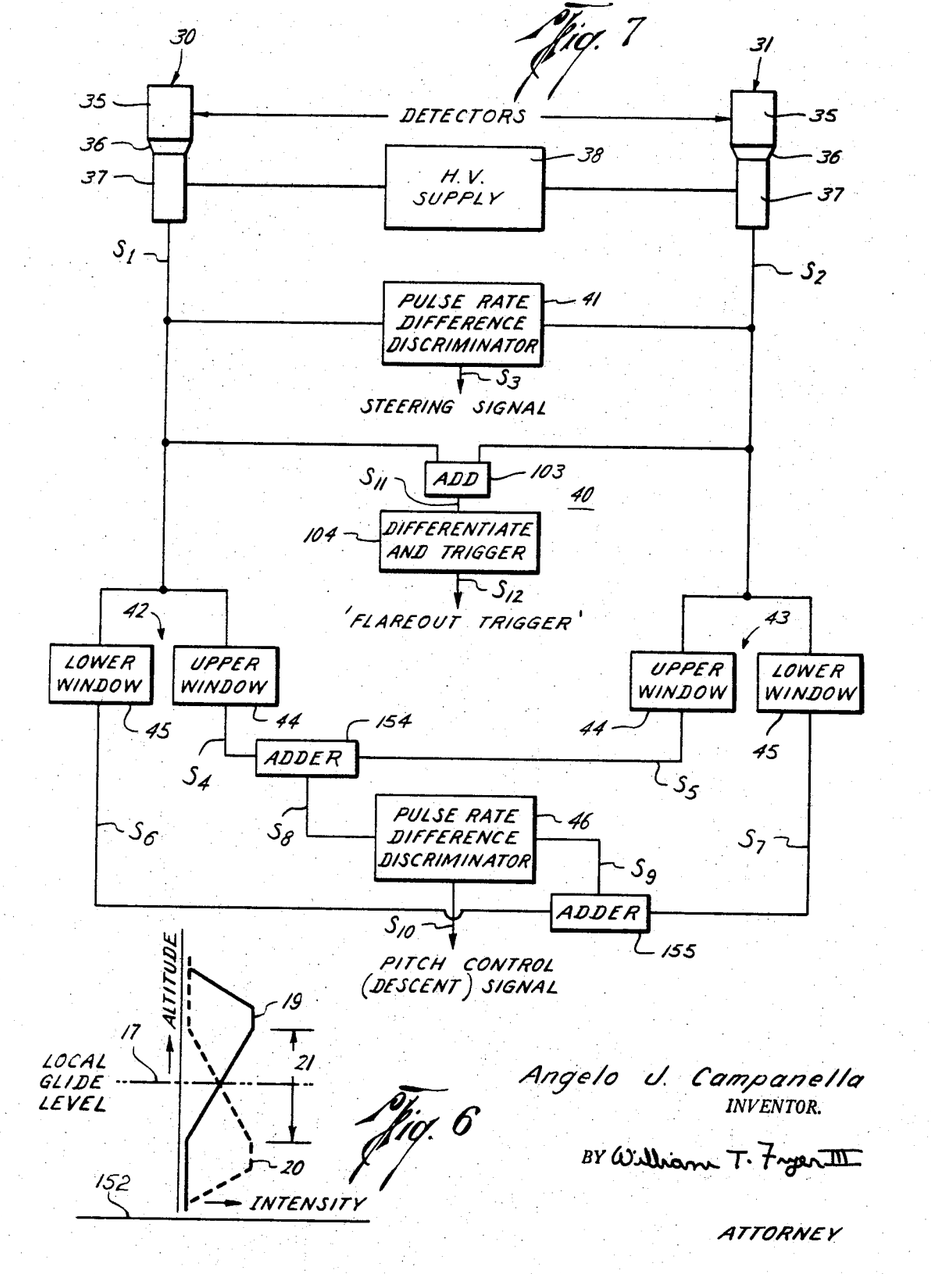
FIG. 6 is a graph for illustrating the operation of the navigational system embodiment disclosed in the present application.
FIG. 7 is one embodiment of an electronic circuit for the detection means mounted on the aircraft in accordance with the present invention.

The intensity of fringe radiation 14 and 15 varies with altitude, i.e., position between beams 5 and 6. FIG. 6 shows the radiation intensity from each of the predominant radiation energy ranges plotted versus altitude. At the altitude or glide path 7, represented by line 17, the fringe radiation intensities for the two predominant radiation energies are substantially equal. Curve 19 represents the fringe radiation intensity of beam 5 and curve 20 (dash-line) represents the fringe radiation intensity of beam 6. It can be seen from FIG. 6 that the radiation intensity of beam 5 is very high above glide path 7 and decreases substantially linearly in the fringe region 21 to a very low value at the lower altitudes. Similarly, for beam 6, the radiation intensity below glide path 7 is substantially constant and at a high level until the fringe region 21 is reached. Then the radiation intensity decreases substantially linearly until it substantially levels off at altitudes above glide path 7.

Figures 8, 9, 10, 11:
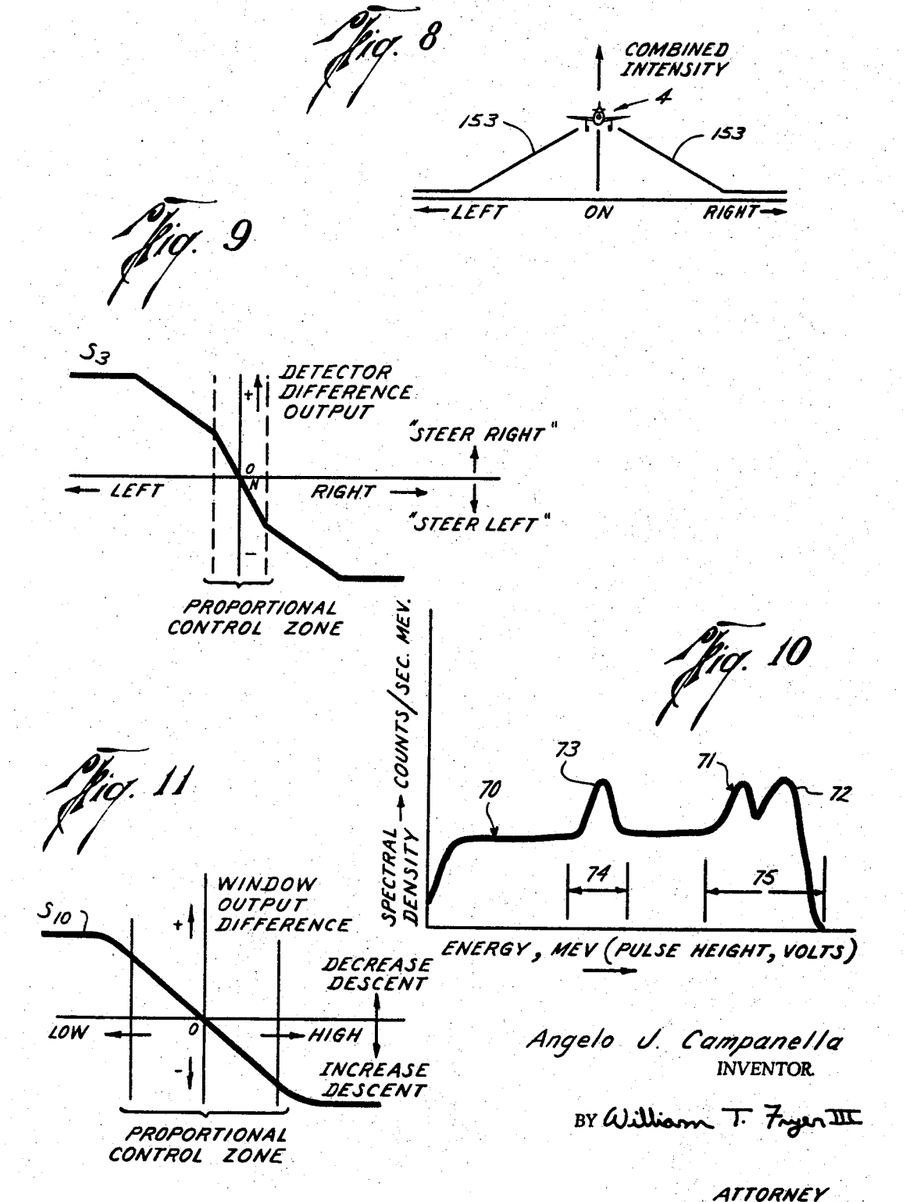
FIG. 8 is another graph for illustrating the operation of the navigational system embodiment disclosed in the present application.
FIG. 9 is another graph for illustrating the operation of the detection means mounted on the aircraft for the disclosed navigational system embodiment.
FIG. 10 is a graph for illustrating the operation of the disclosed navigational system embodiment.
FIG. 11 is another graph for illustrating the operation of the disclosed detection means.

The fringe radiations on lateral sides 10 and 11 (FIGS. 2 and 3) are best illustrated by referring to FIG. 8, where curve 153 is the variation of the combined radiation in-intensity from the beams 5 and 6 with lateral position at the altitude of glide path 7. When aircraft 4 is positioned laterally right "ON" glide path 7, as shown in FIG. 8, the combined radiation intensity is at a maximum. To either side, "LEFT" and "RIGHT" of the "ON" position, the combined radiation intensity decreases substantially linearly and then levels off to a minimum intensity.

It can be seen from the graphs of FIGS. 6 and 8 that aircraft 4 can fly between beams 5 and 6 and stay on glide path 7 by maintaining a position which provides a maximum combined radiation intensity and equal intensity at the two predominant radiation ranges. Of course, other predetermined relationships can be used to maintain a desired position with respect to beams 5 and 6.

The information for navigating aircraft 4 between beams 5, 6 is provided by a detection means mounted on aircraft 4 for measuring the radiation intensity in the two predominant radiation energy ranges and the combined radiation intensity. The detection means provides the signals that are displayed by suitable instruments for the pilot or fed to an automatic pilot that guides aircraft 4 along glide path 7.

The detection means may take several forms and in the disclosed embodiment comprises detectors 30 and 31 (FIGS. 2 and 3) mounted on wings 32 and 33, respectively, spaced apart in essentially the same lateral plane of aircraft 4. Each of detectors 30 and 31 is capable of receiving gamma rays and transforming the gamma-ray intensity into a suitable signal to obtain the navigation information from the beams 5 and 6. Each of detectors 30 and 31 (FIG. 7) comprises a scintillation crystal 35, a light pipe 36, and a photomultiplier tube 37 energized by a high voltage supply 38. Radiation strikes scintillation crystal 35 and produces light pulses with the light intensity amplitude being proportional to the energy of the radiation. The light pulses are coupled through light pipe 36 to photomultiplier 37 where the light pulses are converted into electrical pulses having an amplitude proportional to the light intensity. Light pipe 36 also shields the photomultiplier 37 from all other light energy. Photomultipliers 37 of detectors 30 and 31 produce output signals $S_1$ and $S_2$, respectively of electrical pulses having amplitude proportional to the impinging radiation energy and the pulse rate at any particular energy is proportional to the radiation intensity at that energy. Detectors 30 and 31 are capable of high resolution and are positioned to respond to radiation arriving from any direction at the location on aircraft 4. In other words, detectors 30 and 31 will receive fringe radiation from both beams 5 and 6 and produce electrical pulses proportional to this radiation.

The signals $S_1$ and $S_2$ are processed in a computer 40 (FIG. 7) that derives the signals indicative of the position of aircraft 4. To obtain a signal that is a function of the lateral position of aircraft 4 between beams 5 and 6, the signals $S_1$ and $S_2$ are coupled to a pulse rate difference discriminator 41 that provides a signal $S_3$ that is a function of the difference between the pulse rates of signals $S_1$ and $S_2$. Signal $S_3$ varies, as indicated in FIG. 9, with the lateral position of aircraft 4. When the pulse rates are equal, signal $S_3$ is zero and aircraft 4 is positioned "ON" glide path 7. When aircraft 4 moves to the left of the glide path position, the signal $S_3$ increases in a positive direction, substantially linearly with the distance up to a point where the linear relationship changes but continues again substantially linearly. Similarly, when aircraft 4 moves to the right of the glide path position, the signal $S_3$ goes negative and decreases substantially linearly with distance from the glide path position up to a point where the linearity changes but continues again substantially linearly with distance. The first regions of linear response can be used to guide aircraft 4 to maintain the desired position on glide path 7. The next adjacent regions of response can be used equally as well and a lateral steering meter (not shown) on the pilot's instrument panel can be calibrated in terms of lateral displacement of the aircraft on either side of the glide path 7.

To understand more easily the variation of signal $S_3$ with the lateral position of aircraft 4, refer again to the graph of FIG. 8 wherein the combined radiation intensity is maximum when aircraft 4 is positioned laterally on glide path 7. The steering meter would then be calibrated with the center position representing the zero distance or desired position, and deviations to one side will indicate the amount of steering needed to the right and deviation of the meter in the other direction will indicate the amount of steering needed to the left to restore the aircraft 4 to the glide path position.

To obtain the information for maintaining the altitude of aircraft 4 on the glide path 7, signals $S_1$ and $S_2$ are individually passed through pulse height analyzers 42 and 43, respectively, consisting of separate channels or windows, identified as upper window 44 and lower window 45. The function of discriminators 42 and 43 is to pass all the pulses in the signals $S_1$ and $S_2$, respectively, that are within predetermined amplitude bands. The lower window 45 passes pulses that are from radiation energies in one range and the upper windows 44 pass pulses in another, different amplitude range corresponding to a different energy range of radiation.

In the navigation system 1 the upper window corresponds to the energy range of beam 6 and the lower window corresponds to the energy range of beam 5. The output signal from the upper window 44 of pulse height analyzer 42, $S_4$, is added to the signal from upper window 44 of pulse height analyzer 43, $S_5$, by an adder 154 and coupled to a pulse rate difference discriminator 46. Similarily the output signal from lower window 45 of pulse height analyzer 42, $S_6$, is added to the output signal from lower window 45 of pulse height analyzer 43, $S_7$, by an adder 155 and coupled to pulse rate difference discriminator 46. The addition of signals $S_4$ and $S_5$ provides a signal $S_8$ that is a function of the total radiation intensity in the upper range of radiation energy and the addition of signals $S_6$ and $S_7$ produces a signal $S_9$ that is a function of the combined radiation intensity in the lower energy range. Pulse rate difference discriminator 46 provides a signal $S_{10}$ that is a function of the difference between the pulse rate at the upper and lower energy ranges and, correspondingly, a function of the difference between the radiation received from beams 5 and 6. Signal $S_{10}$ is coupled to altitude steering meter (not shown) on the pilot's instrument panel that is suitably calibrated in units of distance with the center position being zero signal, representing the desired position at the altitude of glide path 7. The variation of signal $S_{10}$ with the vertical position of aircraft 4 between beams 5 and 6 is illustrated in FIG. 11. Signal $S_{10}$ is substantially zero when aircraft 4 is at the altitude of glide path 7. This fact is confirmed by recalling the graph of FIG. 6 in which the radiation intensities from beams 5 and 6 were substantially equal when aircraft 4 was at the altitude 17 of glide path 7.

The altitude steering meter is calibrated to have a center position indicating the zero distance or desired altitude and the deviations to one side will indicate the amount of descent needed and deviation in the other direction will indicate the amount of ascent needed to bring aircraft 4 to the glide path altitude. Signal $S_{10}$ has a range of proportional response whereby the meter can be calibrated in units of distance from the desired glide path altitude.

Figures 4, 5:
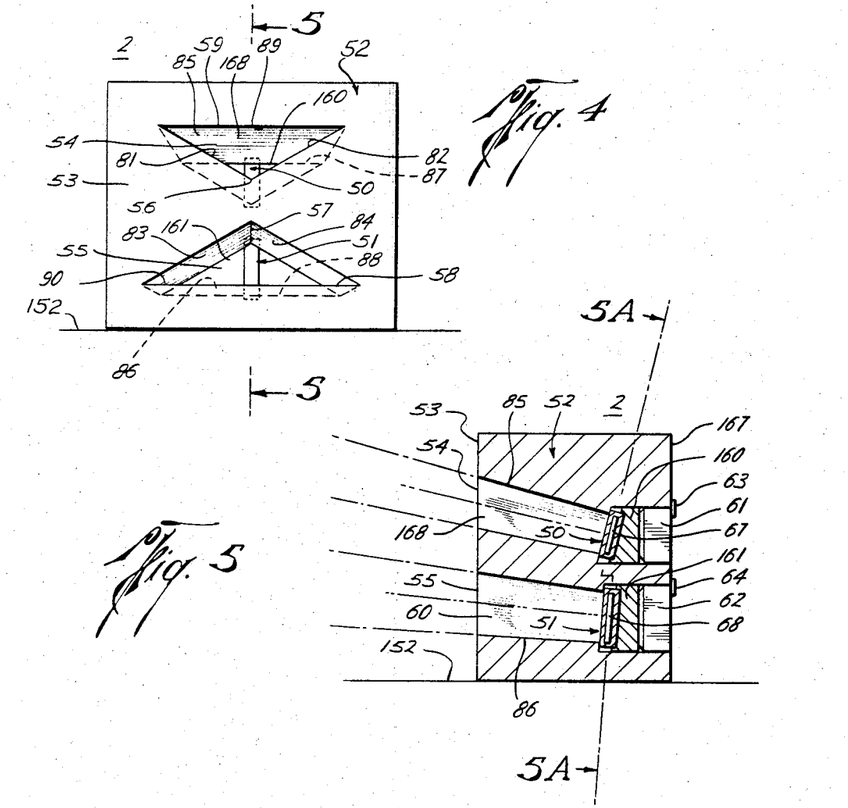
FIG. 4 is a front elevation view of one embodiment of a beacon housing in accordance with the present invention, for use in the navigational system shown in FIG. 1.
FIG. 5 is a cross section view along the lines 5—5 of FIG. 4, showing the internal construction of the beacon housing.
Figure 5A:
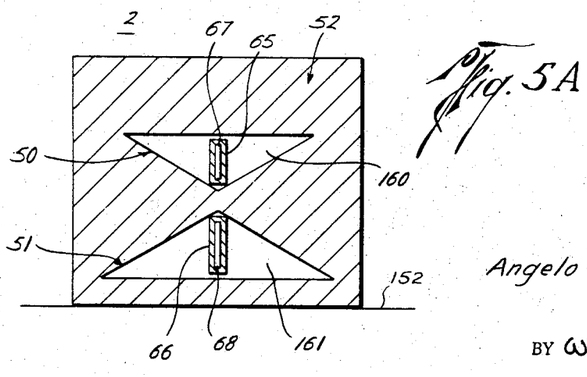
FIG. 5A is a cross view along the lines 5A—5A of FIG. 5.

Landing beacon 2 can be constructed in a number of forms to produce beams 5 and 6. In the illustrated embodiment, landing beacon 2 (FIGS. 4, 5 and 5A) is positioned on ground 152 closely adjacent to the approach edge of runway 3. The beams are formed, as mentioned previously, by shaping the pattern from a radiation source. The nuclear radiation is provided by radioactive sources 50 and 51 disposed in a housing 52. Housing 52 has a front face 53 and a rear face 167 (FIG. 5). Housing front face 53 is oriented in the direction of a glide path 7, i.e., pointing away from and and along the length of the runway 3. Located on housing front face 53 are apertures 54 and 55 having a triangular shape and disposed on a common vertical line that coincides with the bisector of the lower vertex 56 and upper vertex 57, respectively. Aperture 55 has a longer base 58 than the corresponding base 59 of aperture 54.

Housing 52 is constructed of a shield material suitable for collimating the nuclear radiation from radioactive sources 50 and 51. The collimation of the nuclear radiation is accomplished by placing the radioactive sources 50 and 51 at the rear end of passages 168 and 60, respectively, that open into housing face 53 as apertures 54 and 55, respectively. The radioactive sources 50 and 51 are placed within passages 168 and 60, respectively, by removing separate blocks 61 and 62, respectively, after releasing a latch mechanism 63 and 64, respectively. The radioactive sources 50 and 51 comprise a mounting block 160 and 161, respectively, supporting capsules 65 and 66, respectively, having a narrow column (see FIGS. 5 and 5A) of radioactive material 67 and 68, respectively. The radioactive material 68 can be cobalt-60, for example, and the radioactive material 67 can be cesium-137, for example. Each of capsules 160 and 161 is constructed of a material that does not attenuate the gamma radiation appreciably and is positioned outwardly from the face of its respective mounting block.

The radiation from the material comprises monoenergetic photons at an energy of 0.66 mev. for cesium-137 and 1.17 and 1.33 mev. for cobalt-60. The pulse height spectrum produced by detectors 30 and 31 will appear as shown in FIG. 10. The spectral curve 70 shows the photopeaks 71 and 72 for the cobalt-60 radiation at 1.17 and 1.33 mev., respectively, and the photopeak 73 for the cesium-137 radiation at 0.66 mev. Between these peaks, the Compton continuum region occurs. These pulses arise from partially absorbed gammas in the crystal detector as well as from scattered radiation in the atmosphere between the radioactive source and the detector means. At very low energies a thin shield may prove effective, causing the illustrated spectral response to become zero near zero energy.

The pulse height analyzers 42 and 43 are adjusted such that the lower windows 45 pass only pulses in the energy range 74 and the upper windows 44 pass only pulses in the energy range 75. Thus, the pulse height analyzer windows are placed around the spectral peaks. When aircraft 4 is at its proper altitude, on glide path 7, the difference between the outputs of windows 44 and 45 will be zero. When aircraft 4 rises above the glide path 7, the count in the lower windows increases while that in the upper windows decreases. On the other hand, when the aircraft is low, the count in the upper windows increases, while that in the lower windows decreases.

The shaping of beams 5 and 6 is produced by apertures 54 and 55 and passages 168 and 60, respectively. The beam direct radiation cross section, outlined by triangles 12 and 13 (FIGS. 2 and 3) is defined by apertures 54 and 55, respectively. Within the regions represented by triangles 12 and 13 the radiation arrives directly from the entire source materials 67 and 68, respectively. Passages 168 and 60 have planar side walls 81 and 82, and 83 and 84, respectively. The sharp edges of beams 5 and 6 provide the fringe radiation 14 and 15 (FIGS. 2 and 3), since, when aircraft 4 is positioned out of direct line from the radioactive sources 50 and 51, the radiation intensity is substantially less and reduces substantially linearly with increasing distance from the sharp beam edge. Passages 168 and 60 have a planar upper and lower sides 85 and 86, respectively, that have edges 87 and 88 adjacent radioactive sources 50 and 51, respectively, and opposite edges 89 and 90, coinciding with the bases 59 and 58 of apertures 54 and 55, respectively. Passage sides 85 and 86 shape the upper base of beam 5 and lower base of beam 6, respectively.

Figures 12, 13, 14:
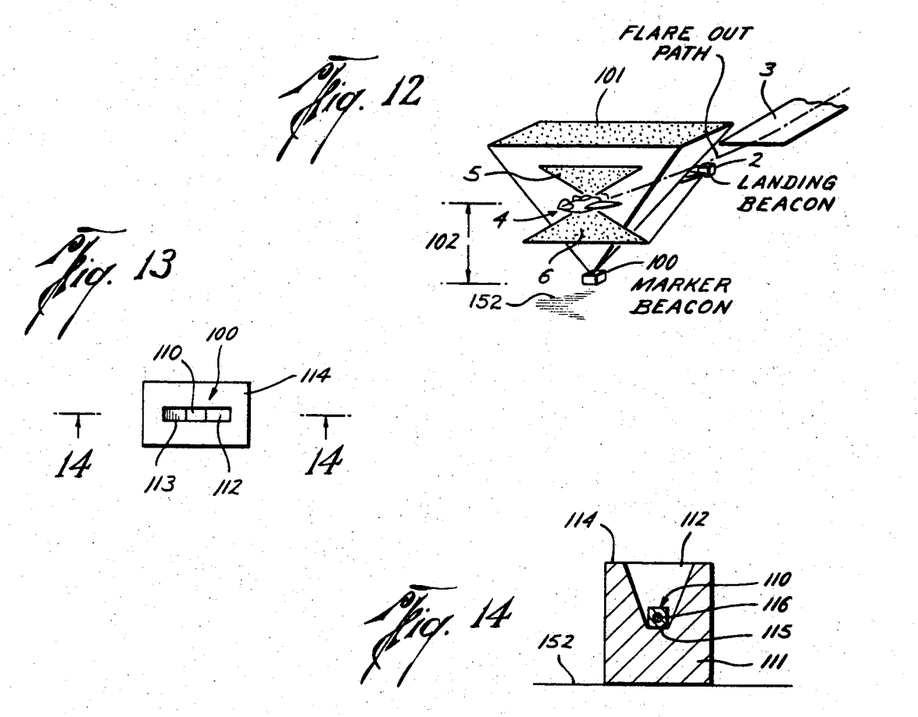
FIG. 12 is a perspective view, partially in section, of the navigational system embodiment of FIG. 1, showing the aircraft passing through the marker beacon.
FIG. 13 is a plan view of one embodiment of marker beacon housing in accordance with the present invention for use in the navigational system shown in FIG. 1.
FIG. 14 is an elevation view in cross section along the lines 14—14 of FIG. 13, showing the interior construction of the marker beacon housing.
Figure 15:
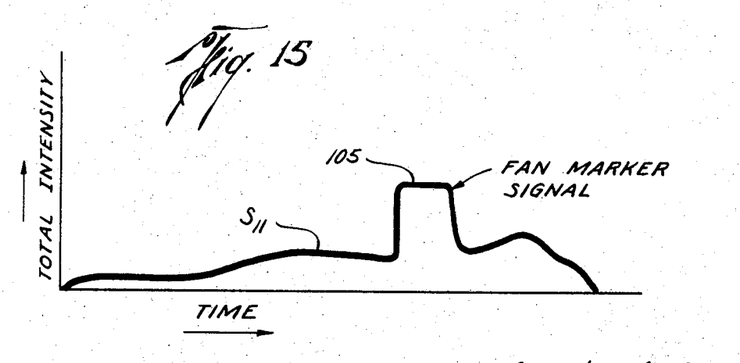
FIG. 15 is a graph for illustrating the operation of the disclosed detection means for the navigational system embodiment of FIG. 1.

To notify the pilot or an automatic pilot that aircraft 4 is within the predetermined slant range and at the touch-down area, where flare-out should occur, marker beacon 100 (FIG. 1) is disposed on ground 152 below the flare-out point to project a radiation beam 101 upward and through the glide path 7. The relationship at the flare-out point is best shown by a close-up view (FIG. 12) showing aircraft 4 about to flare out, being at the flare-out altitude 102. Marker beacon 100 is disposed on the opposite side of landing beacon 2 from runway 3. The marker beam 101 is fan-shaped in a vertical cross section having a relatively narrow width along the slide path. 7. The computer 40 (FIG. 7) is arranged to process the signals $S_1$ and $S_2$ to respond to the marker beacon beam 101 and thereby give an indication of the flare-out point. Signals $S_1$ and $S_2$ are coupled to an adder 103 which produces a signal $S_{11}$ which is a function of the total pulse rate from detectors 30 and 31. Signal $S_{11}$ is coupled to a differentiating trigger circuit 104 that differentiates the signal, producing a trigger pulse where an abrupt change in signal level occurs—where the marker beam 101 is located, to provide an output signal $S_{12}$ that can be used to trigger a flare-out marker in one of the pilot's instruments or to activate a control device on the autopilot. The signal $S_{11}$ varies with time, as shown in FIG. 15, where the total radiation intensity from detectors 30 and 31 is plotted against time. When aircraft 4 is on the outer portion of glide path 7, signal $S_{11}$ increases slowly. However, upon entering the radiation from marker beacon 100, signal $S_{11}$ increases suddenly to a high value 105. This abrupt change at the marker beam 101 is sufficient to produce a sharp trigger signal $S_{12}$ for activating a flare-out marker on an instrument.

Range, or distance-to-touchdown can be indicated by computer 40. When aircraft 4 flies in one of beams 5 or 6, signal $S_{11}$ is a function primarily of distance to beacon 2. A meter (not shown) receives signal $S_{11}$ and is calibrated for the particular beam, normally beam 6, in units of distance. Alternatively, range can be indicated by signal $S_{11}$ when aircraft 4 is on glide path 7, receiving equal amounts of fringe radiation from beams 5 and 6.

The construction of the marker beacon 100 may take several forms. In the illustrated embodiment, the fan-shaped beam 101 is formed by collimating radiation from a radioactive source 110 (FIGS. 13 and 14) disposed in housing 111 positioned on ground 152. Radioactive source 110 is disposed in a wedge-shaped slot 112 having a rectangular-shaped aperture 113 at its upper face 114. The radiation of marker beacon 100 is nuclear, and, as mentioned before, can be of any of the aforementioned types. The radioactive source 110 can be a capsule 115 containing a quantity of radioactive material 116, such as cesium-137, to produce a beam of gamma radiation. The cesium-137 photopeak 73 (FIG. 10) of marker beacon 100 falls within the channel of lower window 45 of computer 40. When the marker beam 101 is entered, both detectors 30 and 31 receive its radiation and part of signals $S_1$ and $S_2$ will include the pulses from this radiation which will pass on through the lower windows 45 to temporarily render the information from the landing pitch and steering signals $S_3$ and $S_{10}$ ineffective. However, at this point, the pilot or the automatic pilot is aware that flare-out has been reached and either visual or further guidance by the computer 40 can occur after passing through the marker beam 101. A different energy range can be used for marker beam 101. For example, another radioactive material having a photopeak that does not lie within the lower window 45 or upper window 44 will provide the flare-out trigger signal $S_{12}$ and not interfere with the pitch and steering information from signals $S_3$ and $S_{10}$.

The particular arrangement of computer 40 is merely one example of suitable equipment and each of the individual blocks of the circuit diagram may consist of one or more units or components of a standard design and arrangement or the functions of several blocks can be combined in one unit. For example, the pulse rate difference discriminator 41 and 46 can have the functions of integrating the received pulses to provide separate control signals that vary with the pulse rate and these control signals are combined to obtain the difference between the pulse rates to produce signal $S_3$. The particular polarity of the signals involved, including the polarity of the signals $S_1$ and $S_2$, determine the type of circuits employed, i.e., whether adder or subtracter circuits are used. It is apparent to one skilled in the art that computer 40 may be rearranged simply by varying the polarities of signals. For this reason, when adder 103 is shown, for example, as a means of combining signals $S_1$ and $S_2$, it being assumed that signals $S_1$ and $S_2$ are of the same polarity, it must be equally obvious that a subtracter would be used if the signals were of opposite polarity. Accordingly, the computer 40 of the present invention is not restricted to a particular circuit design, but is capable of several arrangements to carry out the functions described above.

Having described a preferred embodiment of the present invention for precise navigation of an aircraft, it is similarly apparent that the present invention has application to a number of types of craft and various modifications, changes, and additions may be made. The steering, pitch, and flare-out signals can be displayed on the pilot's instrument panel in a convenient manner to present an integrated flight presentation such as used with the ILS system. Another set of landing beams may be projected in another direction from landing beacon 2 for use in bringing an aircraft along a second glide path. Similarly, the landing beams may be spaced vertically for use with aircraft and laterally for use with ships or other types of craft that must follow a predetermined path along a planar surface. These and other modifications, changes, and arrangements of the disclosed embodiment are to be considered as part of the present invention as defined in the appended claims.

What is claimed is:
1. A landing system for aircraft, comprising:
a beacon to be positioned adjacent a landing area to radiate two beams of nuclear radiation upward in the direction of a glide path to the landing area, one of said beams having one predominant radiation energy range and another beam having another predominant radiation energy range, said one and another beams being spaced along a glide path to form a region of commingled radiation energies with a region of said one predominant radiation energy range to one side and a region to the other side of said other predominant radiation energy range,
an aircraft,
means mounted on said aircraft for detecting the nuclear radiation to indicate the position of said aircraft between said beams, and said beacon comprising a first housing constructed of a shield material for said nuclear radiation, radioactive materials in said housing having different predominant energy ranges, a first aperture in said housing for collimating the radiation from one of said radioactive materials to form said one beam, a second aperture in said housing, above said first aperture, for collimating the radiation from another of said radioactive materials to form said another beam, said first and second apertures being tapered upward and downward, respectively, to shape said beams, each of said radioactive materials being mounted in containers to form a line source disposed substantially vertically and midway of the respective apertures to form each beam with high intensity radiation from directly out of the respective apertures and fringe, decreasing intensity radiation from the sides, where the radiation is not directly from the respective radioactive materials.

2. A landing guidance installation for combination with an aircraft having a nuclear radiation detection means comprising:

a first beacon to be positioned adjacent a landing area to emitting beams of nuclear radiation upward in the direction of a glide path to the landing area, one of said beams having one predominant radiation energy range, another beam having another predominant radiation energy range, said one beam being vertically spaced above said another beam to form a region along said glide path of commingled radiation energies with a region above said glide path of said one predominant radiation energy and a region below said glide path of said another predominant radiation energy, and regions to either side of said glide path of diminishing radiation intensity, and a second beacon near the landing area for emitting a beam of nuclear radiation substantially upward, said first beacon comprises a first housing constructed of a shield material for said nuclear radiation, radioactive materials in said housing having different predominant energy ranges, a first aperture in said housing for collimating the radiation from one of said radio-active materials to form said one beam, a second aperture in said housing, above said first aperture, for collimating the radiation from another of said radio-active materials to form said another beam, said first and second apertures being tapered upward and downward, respectively, to shape said beams, each of said radio-active materials being mounted in a container to form a line source disposed substantially vertically and midway of the respective apertures to form each beam with high intensity radiature from directly out of the respective apertures and fringe, decreasing intensity radiation on the sides, where the radiation is not directly from the respective radioactive materials, and said second beacon comprising a second housing constructed of a shield material for said nuclear radiation, a third radioactive material in said second housing having a predominant radiation energy range, a third aperture in said second housing having opposite sides tapering toward said third radioactive material to collimate the radiation of said third beam into a fan-shape to lie in a substantially vertical plane.

3. A navigation system for an aircraft, comprising:

a first beacon to be positioned adjacent a designated landing area for projecting first and second beams of nuclear radiation spaced apart to define a common region of fringe radiation from both of said beams along a glide path, a second beacon to be positioned near the landing area to project a third beam of nuclear radiation generally upward, an aircraft, means mounted on said aircraft for detecting the nuclear radiation to indicate the position of said aircraft relative to said first and second beams and the presence of said third beam, and said first and second beams are tapered toward each other to limit said region size across one dimension, and said third beam is fan-shaped in a vertical plane and of relatively narrow width along the glide path.

4. A landing beacon to be positioned near a designated area for combination with a craft having a nuclear radiation detection means, said beacon comprising means to be positioned adjacent the designated area for emitting beams of nuclear radiation in the same general direction of a designated path to the designated area, one of said beams having one predominant radiation energy range, another beam having another predominant radiation energy range, said one beam being spaced from said another beam to form a region along said path of commingled radiation energies with a region of said one predominant radiation energy to one side and a region to the opposite side of said another predominant radiation energy, and regions at the other opposite sides of diminishing radiation energy, and said emitting means comprising a first housing constructed of a shield material for said nuclear radiation, radioactive materials in said housing having different predominant energy ranges, a first aperture in said housing for collimating the radiation from one of said radioactive materials to form said one beam, a second aperture in said housing, above said first aperture, for collimating the radiation from another of said radioactive materials to form said another beam, said first and second apertures being tapered upward and downward, respectively, to shape said beams, each of said radioactive materials being mounted in a container to form a line source disposed substantially vertically and midway of the respective apertures to form each beam with high intensity radiation from directly out of the respective apertures and fringe, decreasing intensity radiation on the sides, where the radiation is not directly from the respective radioactive materials.

5. A navigation system for a craft, comprising a beacon to be positioned adjacent a designated area for projecting two beams of nuclear radiation spaced apart to define a common region of fringe radiation from both of said beams, a craft, means mounted on said craft for separately detecting said radiation from each of said beams and indicating the position of said craft in said common region relative to said beams, one of said beams has one predominant radiation energy range and the other beam has another predominant radiation energy range, said radiation energy ranges being comingled in said common region, said detection means separately indicating the radiation intensity in each of said energy ranges.

6. A navigation system, as described in claim 5, wherein, said beams are tapered toward each other to limit said common region size across one dimension.

7. A navigation system, as described in claim 5, wherein, said detection means comprises radiation detectors as spaced locations on said craft, each of said detectors producing an electrical signal that is a function of the radiation intensity at its respective location, and said detection means comprises means for combining said detector signals to produce a first signal that is a function of the position of said craft between said beams and a second signal that is a function of the lateral position of said aircraft within said beams.

8. A landing system for aircraft, comprising, a beacon to be positioned adjacent a landing area to radiate two beams of nuclear radiation upward in the direction of a glide path to the landing area, one of said beams having one predominant radiation energy range and another beam having another predominant radiation energy range, said one and another beams being spaced along a glide path to form a region of comingled radiation energies with a region of said one predominant radiation energy range to one side and a region to the other side of said other predominant radiation energy range, an aircraft, means mounted on said aircraft for separately detecting the nuclear radiation from each of said beams to indicate the position of said aircraft in said common region between said beams.

9. A landing system, as described in claim 8, wherein, said beacon comprises two nuclear radiation emitters and means for shaping the radiation from said emitters into said two beams that project outward in one general direction, one of said beams being above the other beam.

10. A landing system, as described in claim 8, wherein, said detection means comprises radiation detectors at spaced locations on said aircraft, each of said detectors producing an electrical signal that is a function of the radiation intensity at its respective location, and means for combining said detector signals to produce a first signal that is a function of the lateral position of said aircraft between said beams and a second signal that is a function of the position of said aircraft between said beams.

11. A landing system, as described in claim 8, wherein, said detection means comprises first and second radiation detectors mounted on said aircraft at spaced locations in substantially the same lateral plane, each of said detectors producing electrical pulses having amplitude substantially proportional to the radiation energy at the respective locations, means for comparing the pulse rates from said detectors to produce a first signal that is a function of the pulse rate difference, a second signal that is a function of the difference between the total pulse rate from both of said detectors for said one energy range and the total pulse rate from both of said detectors for said another energy range.

12. A landing guidance installation for combination with an aircraft having a nuclear radiation detection means comprising, a first beacon to be positioned adjacent a landing area to emitting beams of nuclear radiation upward in the direction of a glide path to the landing area, one of said beams having one predominant radiation energy range, another beam having another predominant radiation energy range, said one beam being vertically spaced above said another beam to form a region along said glide path of comingled radiation energies with a region above said glide path of said one predominant radiation energy and a region below said glide path of said another predominant radiation energy said beams being tapered towards each other to form regions to either side of said glide path of diminishing radiation intensity, and a second beacon near the landing area for emitting a beam of nuclear radiation substantially upward.

13. A landing guidance installation, as described in claim 12, wherein, said first beacon comprises two nuclear radiation emitters and means for shaping the radiation from said emitters into said two beams that project outwardly in one general direction and are tapered toward each other, and said second beacon comprises a radiation emitter having a predominant energy range and means for shaping the radiation from said second beacon to form said third beam.

14. A navigation system for an aircraft, comprising, a first beacon to be positioned adjacent a designated landing area for projecting first and second beams of nuclear radiation spaced apart to define a common region of fringe radiation from both of said beams along a glide path, a second beacon to be positioned near the landing area to project a third beam of nuclear radiation generally upward, an aircraft, means mounted on said aircraft for separately detecting the nuclear radiation to indicate the position of said aircraft in said common region relative to said first and second beams and the presence of said third beam, one of said beams has one predominant radiation energy range and the other beam has another predominant radiation energy range, said radiation energy ranges being comingled in said common region, said detection means separately indicating the radiation intensity in each of said energy ranges.

15. A navigation system, as described in claim 14, wherein, one of said first and second beams has one predominant radiation energy range and the other of said first and second beams having another predominant radiation energy range, radiation energy ranges being comingled in said region, said detection means separately indicating the radiation intensity in each of said energy ranges and the total radiation intensity to detect the presence of said third beam.

16. A navigation system, as described in claim 14, wherein, said detection means comprises radiation detectors at spaced locations on said craft, each of said detectors producing an electrical signal that is a function of the radiation intensity at its respective location, and means for combining said detector signals to produce a signal that is a function of the position of said craft between said beams and a second signal that is a function of the lateral position of said aircraft within said first and second beams, and a third signal that is a function of the presence of said third beam.

17. A landing system, as described in claim 14, wherein, said detection means comprises first and second radiation detectors mounted on said aircraft at spaced locations in substantially the same lateral plane, each of said detectors producing electrical pulses having amplitude substantially proportional to the radiation energy at the respective locations, means for comparing the pulse rates from said detectors to produce a first signal that is a function of the pulse rate difference, a second signal that is a function of the difference between the total pulse rate from both said detectors for said one energy range and the total pulse rate from both said detectors for said another energy range, and a third signal that is a function of the total pulse rates from said detectors.

18. A landing beacon to be positioned near a designated area for combination with a craft having a nuclear radiation detection means, said beacon comprising means to be positioned adjacent the designated area for emitting beams of nuclear radiation in the same general direction of a designated path to the designated area, one of said beams having one predominant radiation energy range, another beam having another predominant radiation energy range, said one beam being spaced from said another beam to form a region along said path of comingled radiation energies, said beams being tapered towards each other with a region of said one predominant radiation energy to one side of said path and a region to the opposite side of said path of another predominant radiation energy, and regions at the other opposite side of diminishing radiation energy.

19. A landing guidance installation, as described in claim 18, wherein, said emitting means comprises two nuclear radiation emitters and means for shaping the radiation from said emitters into said two beams and tapering said beams toward each other.

References Cited

UNITED STATES PATENTS

| | | | |
|---|---|---|---|
| 1,948,552 | 2/1934 | Weber et al. | 343—101 |
| 2,441,877 | 5/1948 | Flett | 340—264 |
| 2,992,330 | 7/1961 | Cooper et al. | 250—71.5 |

RALPH G. NILSON, *Primary Examiner.*

S. ELBAUM, *Assistant Examiner.*